United States Patent [19]

Orndorff, Jr.

[11] 4,331,496
[45] May 25, 1982

[54] BEARING ASSEMBLY AND METHOD FOR MAKING SAME

[75] Inventor: Roy L. Orndorff, Jr., Kent, Ohio

[73] Assignee: The B. F. Goodrich Company, Akron, Ohio

[21] Appl. No.: 129,159

[22] Filed: Mar. 10, 1980

[51] Int. Cl.$^3$ .............................................. B65H 8/00
[52] U.S. Cl. ...................................... 156/187; 308/238; 308/DIG. 12
[58] Field of Search ............... 156/184, 185, 187, 188, 156/195, 194, 193, 172; 308/238, 237 R, DIG. 12

[56] References Cited

U.S. PATENT DOCUMENTS

| | | | |
|---|---|---|---|
| 3,023,059 | 2/1962 | Kirk | 308/238 |
| 3,045,285 | 7/1962 | Baird et al. | 156/193 X |
| 3,932,004 | 1/1976 | Orndorff | 308/238 |
| 3,974,009 | 8/1976 | Butzow | 308/238 X |

*Primary Examiner*—David A. Simmons
*Attorney, Agent, or Firm*—J. Januszkiewicz

[57] ABSTRACT

A non-metallic bearing (10) is comprised of a fiberglass reinforced elastomer, preferably a rubber matrix (22), inner portion, or bearing blank (11), and a fiberglass reinforced plastic, preferably an epoxy matrix (33), outer portion, or shell (12). A piece (20) having predetermined dimensions is cut from a sheet (16) of fabric (14) loosely woven from reinforcing glass cords. The piece (20) is bent into a hoop (13) and inserted into a mold casing (21). An elastomer chosen to form the matrix (22) of the bearing blank (11) is injected into the mold casing (21) and cured. The bearing blank (11) is pressed from the mold casing (21) and mounted on a mandrel (25). As the mandrel (25) is rotated a woven reinforcing fabric (26) is wound onto the outer periphery of the bearing blank (11). The fabric (26) is impregnated with a plastic resin chosen to constitute the matrix (33) of the outer shell (12). When the resin is cured the bearing (10) may be removed from the mandrel and the outer shell (12) may be machined to the desired outer diameter.

9 Claims, 6 Drawing Figures

BEARING ASSEMBLY AND METHOD FOR MAKING SAME

TECHNICAL FIELD

The present invention relates to elastomeric bearings of the type that are lubricated by liquids, such as water, and of the type which utilize a resilient, elastomeric bearing blank secured within rigid, non-metallic shell, or support, and more particularly to a method by which such bearings may be manufactured.

BACKGROUND ART

Liquid lubricated, elastomeric bearings, such as those shown in U.S. Pat. No. 3,932,004, have particular applicability to marine applications. So used, the surrounding environment itself provides the lubricant.

Traditionally, liquid lubricated bearings have had a metallic support shell such as brass or stainless steel. Those materials, however, tend to be quite expensive and relatively heavy. Simply to replace brass with a less expensive metal, however, does not reduce the weight, and the various manufacturing and machining steps required to complete the product maintain a significantly high cost for such bearings. Attempts at using non-metallic bearing shells—which virtually eliminates galvanic erosion—have been similarly unsuccessful, because such shells are so easily damaged by the heat necessary to cure the bearing member in situ and also because of the difficulty in achieving an acceptable bond between the bearing member and the shell within which it is to be housed. More recent advances have given rise to bearings wherein the support shell is made from fiberglass reinforced rubber, hereinafter designated as FRR.

The FRR material by itself, however, has a relatively flexible, non-rigid outer surface which is mentally unacceptable to many would-be users. In order to overcome this problem of mental acceptability it has heretofore been attempted to house an FRR bearing within a metallic housing, but that arrangement unnecessarily compounds the cost for no real technical advantage.

Moreover the flexibility in the outer surface of an FRR bearing does make it somewhat difficult to insert such a bearing into a rigid housing of customary construction.

Finally, FRR bearings are commonly manufactured in transfer molds which not only effectively limits the size of the bearing shells that can be so made but is also a particularly costly process for making relatively large bearings.

DISCLOSURE OF THE INVENTION

The present invention, which uses a composite of FRR and fiberglass reinforced plastic, hereinafter designated as FRP, overcomes the disadvantages, both real and imagined, experienced with FRR bearings. A bearing manufactured in accordance with the present invention has an FRR bearing blank portion and an FRP shell portion, thus the desired bearing properties are retained while at the same time providing a more rigid shell. The process of applying the FRP shell to the FRR bearing is relatively uncomplicated and can provide an extremely accurate outer diameter without the use of any expensive transfer mold operations.

It is, therefore, an object of the present invention to provide an improved FRR-FRP bearing as well as a method for making same.

It is another object of this invention to provide an improved method for manufacturing FRR-FRP bearings wherein the FRR portion—the bearing blank—is cured in a simplified mold casing, and after removal therefrom the FRP portion—the outer shell—is formed directly onto the outer circumference of the FRR bearing portion.

A further object of the present invention is to provide an improved method for the manufacture of FRR-FRP bearings wherein a fabric woven from reinforcing strands and impregnated with a plastic resin may be simultaneously applied to the outer periphery of a preformed FRR bearing.

A still further object of the present invention is to provide an improved method for manufacturing an FRR-FRP bearing wherein a preformed FRR bearing blank, which is preferably cylindrical in shape, is mounted on a mandrel and rotated; during rotation of the FRR bearing blank at least one layer of woven glass fiber fabric and thermosetting resin are simultaneously applied to the outer circumference of the performed FRR bearing.

These and other objects, together with the advantages thereof over existing and prior art forms which will become apparent from the following specification, are accomplished by means hereinafter described and claimed.

In general, the method for manufacturing the composite FRR-FRP bearing to which the present disclosure is directed includes the steps of preforming a fiber reinforced elastomeric bearing blank, mounting the bearing blank on a rotatable spindle, simultaneously rotating the spindle, wrapping a fiber fabric onto the outer circumference of the bearing blank, and impregnating the fiber fabric with a plastic resin and, curing the resin to complete the fiber reinforced plastic shell.

Formation of the fiber reinforced bearing blank begins by coating a reinforcing fabric with a suitable rubber solvent cement which is then permitted to dry. The coated fabric is next cured or first it may be combined with an additional layer of fabric on one or both sides following which the di- or trilaminate structure is cured to provide the coated reinforcing or laminate fabric. When additional layers of fabric are added to the first coated fabric, a primer can be applied over the dried rubber cement.

The resulting laminate fabric may then be cut into predetermined sizes. A piece of the fabric, so cut, is bent into a single, circumferential hoop and inserted into a mold casing. An uncured elastomer is also injected into the mold casing and cured to be circumferentially encapsulated by the hooped fabric, thus performing an FRR bearing which, after being cured, is removed from the mold casing.

The preformed FRR bearing blank is, after its removal from the mold casing, mounted on a mandrel and rotated. As the FRR bearing blank is rotated a fabric is wound onto the peripheral surface of the bearing blank. The fabric is impregnated with a liquid resin which is thereafter cured to form the rigid FRP shell. The shell may then be accurately machined to its desired final configuration.

One preferred embodiment is shown by way of example in the accompanying drawings and described in detail without attempting to show all of the various forms and modifications in which the invention might be embodied; the invention being measured by the appended claims and not the details of the specification.

A PREFERRED EMBODIMENT FOR CARRYING OUT THE INVENTION

An FRR-FRP bearing, embodying the concept of the present invention and made pursuant to the method thereof, is identified generally by the numeral 10 on the enclosed drawings. The bearing 10 comprises an FRR bearing blank 11 that is encased within a substantially rigid, FRP outer shell 12.

Figure 1:
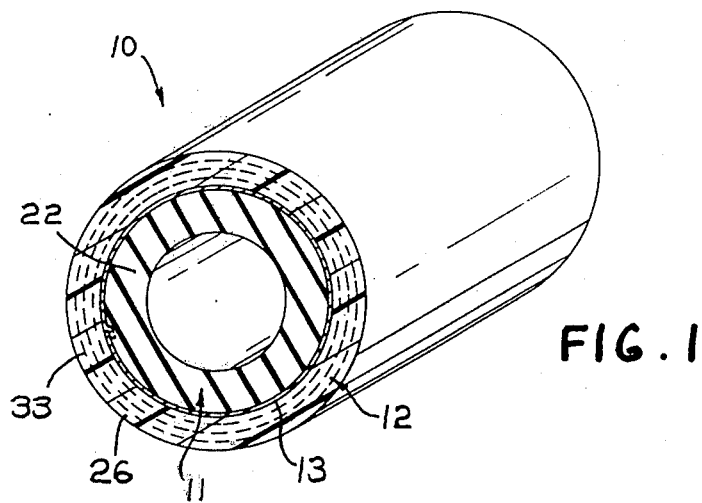
FIG. 1 is a perspective view, partly in section, depicting an exemplary FRR-FRP bearing embodying the concepts of the present invention and having been made pursuant to the method thereof.
Figure 2:
FIG. 2 is a perspective view of a sheet of fabric comprising a middle layer of fabric woven from reinforcing cords, said middle layer having been treated with a rubber solvent cement, sandwiched between two additional layers of similarly woven reinforcing cords and the rubber cement cured to form a trilaminate.

The FRR bearing blank 11 begins with a hoop 13 of reinforcing material which may originate from the sheet 16 of fabric 14 depicted in FIG. 2. The fabric 14 may comprise a single layer or, as depicted, a multi-layered laminate. The central layer 15 of the exemplary tri-laminate fabric 14 is woven from reinforcing cords—it being expressly understood that the term "cords" includes cords, strands and/or other thread-like forms known to the art. The cords are most suitably made from a material that will not corrode and/or shrink in the liquid environment wherein the FRR-FRP bearing 10 will eventually be used. Because one of the primary purposes of the cords is to impart rigidity and strength to the finished bearing, the material from which the cords are made should possess not only a relatively high modulus but also a high ultimate tensile strength. It is also highly desirable that the cords not conduct electricity. The characteristics of glass make it an exemplary material from which to weave layer 15.

Large sheets 16 of the laminated fabric 14 woven from glass cords are dipped in a nitrile rubber solvent cement—or the cement may be otherwise conveniently applied—and allowed to dry. Use of a nitrile rubber solvent cement is preferred first, because nitrile rubbers are oil resistant and second, because they are capable of withstanding long periods of heat. Heat resistance is a necessary characteristic not only because the nitrile rubber solvent cement is subjected to two periods of cure, but also in order to resist degradation that could occur with any build-up of heat during use of the bearing.

Additional strength may be imparted by applying another sheet of similarly woven material, though not coated with cement, against one or both surfaces of layer 15. As shown, layers 18 and 19 may sandwich layer 15. With the layers pressed together the cement is cured to form the laminated fabric 14. Curing is effected in a conventional manner in a press for about one hour at a temperature of approximately 177° C. or until the nitrile rubber coating is very hard, making the laminated fabric 14 stiff. Sufficient stiffness is required to allow the fabric to maintain its integrity within the mold during subsequent extrusion of the elastomeric material. As will be appreciated by those skilled in the art, suitable crosslinking ingredients can be employed with the rubber solvent cement to provide the required hardness within the curing conditions that are to be employed. After curing, the fabric 14 may be stored for indefinite periods without deleterious effect.

Figure 3:
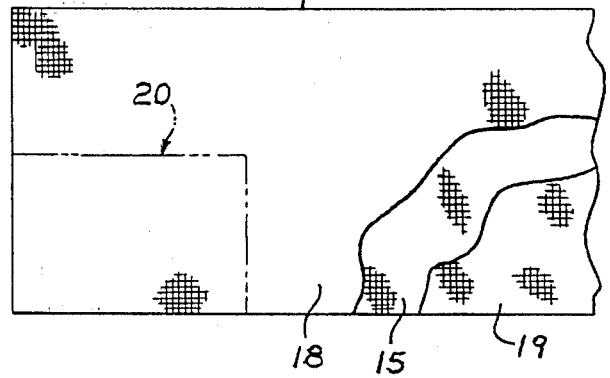
FIG. 3 is a transverse sectional view through a mold casing containing a piece cut from the fabric depicted in FIG. 2 and bent into a single circumferential hoop, an uncured elastomeric material having been injected into the fabric within the mold casing and cured; and, FIG. 4 is a schematic side elevation, partly in section, depicting a reinforcing fabric being wound onto an FRR bearing blank and being impregnated with a thermosetting resin.

When the fabric 14 is to be used a piece 20 having predetermined surface dimensions may be cut therefrom. The dimensions of the piece 20 are such that it will extend substantially the axial dimensions of the FRR bearing blank 11 in which it is to be encapsulated, and the piece 20 is of such transverse dimension that it may be bent into a single, circumferential hoop 13 for insertion into the mold casing 21 depicted in FIG. 3.

With the piece 20 of fabric 14 thereby positioned within the mold casing 21, a suitable elastomeric material is injected into the casing 21 and cured to form the bearing blank 11. The internal bearing surface may be shaped as desired, but two advantageous configurations are shown and described in said U.S. Pat. No. 3,932,004 wherein the internal bearing surface is landed.

The elastomeric material forming the matrix 22 of the bearing blank 11 is typically a vulcanized rubber composition that will exhibit a low coefficient of friction when lubricated by water, in the case of marine type bearings, or by other liquids, in case of lubrication by liquids other than water, and a composition that will not be damaged by such liquids.

The elastomeric material should be of adequate resiliency, yet have sufficient strength and heat resistance to withstand temporary operation out of the presence of the lubricating liquid, such as may occur at start-up.

Excellent composition candidates for this purpose are various conventional nitrile rubber compositions, particularly compositions comprising polymers of butadiene and acrylonitrile where butadiene is the major component of the polymer. Also, natural and other synthetic rubber compositions are possible, provided that they have the properties previously enumerated.

The casing 21 should be designed so that after the elastomeric matrix material 22 is cured the FRR bearing blank 11 can be easily removed for further processing. Irrespective of whether the hooped piece 20 of fabric 14 is a di- or trilaminate, a surface layer will be provided from a material that has not been coated with rubber cement. As such, the peripherally outer layer 18 or 19 will engage the radially inner surface of the casing 21 and the injected matrix material 22 encapsulated by the hooped piece 20 will not permeate the fabric 14 to any degree sufficient to adhere to the casing 21 as the matrix is cured. As such, even such materials as brass or steel work quite satisfactorily as a casing material.

After the FRR bearing blank 11 is cured and removed from the casing 21 it is mounted on a mandrel 25.

The mandrel 25 is operatively connected to be rotated by a suitable power source, not shown, in a manner well known to the art. As the mandrel is rotated the components forming the FRP shell portion 12 are applied. In short, a woven fabric 26 is wound onto the outer periphery of the bearing blank 11, and the fabric 26 is impregnated with a suitable epoxy resin 28.

By using a fabric 14 woven from glass strands, and laminated as previously described, three additionally favorable results are achieved. The hoop 13 stabilizes the cured matrix material 22 so that a simple mandrel may be employed; the hoop provides a surface to which the resin 28 can adhere with minimal, if any, prior preparation; and, because the hoop is woven from the same cords used to weave the fabric 26 reinforcing the shell portion 12, any deleterious internal stresses that might result from employing reinforcing cords having different coefficients of expansion are eliminated.

Figure 4:
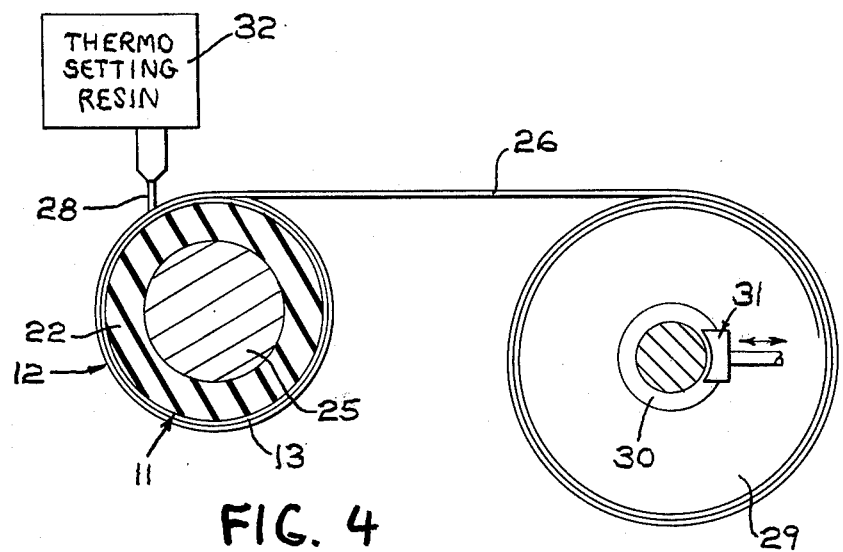
Figure 5:
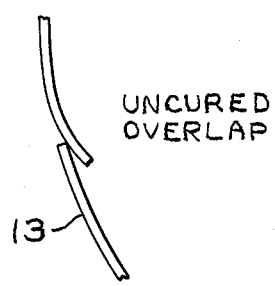
FIG. 5 is an enlarged fragmentary side elevational view of a portion of a hooped fabric prior to vulcanization.
Figure 6:
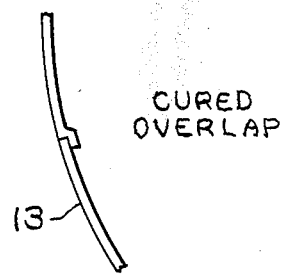
FIG. 6 is an enlarged fragmentary side elevational view of a portion of the hooped fabric after vulcanization.

As depicted in FIG. 4, the fabric 26 is supplied from a storage roll 29 which is mounted on a conventional axle and bearing assembly 30. Roll 29 is supplied with a brake mechanism 31 which can apply a tensile force to the fabric 26 and therefore control the stretch of the fabric 26 as it is wound onto the FRR bearing blank 11 by rotation of the mandrel 25.

The fabric 26, which may also preferably be woven of glass cords, is applied to the outer surface of the bearing blank 11 and simultaneously coated with an epoxy resin from a reservoir 32 to form matrix 33. The epoxy resin can be applied manually or by any known mechanical arrangement. The number of layers of fabric 26 which are applied to the outer surface of the bearing blank 11 can be predetermined. As such, the basic outer diameter of the finished bearing 10 is closely controllable.

When the desired basic outer diameter of the bearing assembly is achieved, the mandrel 25 with the bearing 10 thereon is set aside and the resin matrix 33 is permitted to cure at room temperature. Epoxy resins typically do not need a heating or pressure curing process.

After the FRP shell 12 has hardened, the resultant bearing 10 is removed from the mandrel 25. The bearing 10 may then be accurately machined to its finished outer dimensions by grinding the outside diameter of the FRP shell 12.

The aforedescribed FRR-FRP construction for a bearing 10 offers the advantage that if the outside diameter is machined to a smaller dimension than desired, additional epoxy impregnated fabric 26 can be applied, and the bearing can be salvaged.

In some instances the same inside bearing diameter may be desired but differing outside diameters are necessary. This can be easily accomplished by making a plurality of bearings to a common inside diameter and then grinding separate and distinct outside diameters. Moreover, by utilizing known fiberglassing techniques it is also possible to establish a flanged outer surface for the finished bearing.

The construction of the bearing 10 heretofore described is sufficiently inexpensive to make that such bearings can be economically replaced in their entirety as they wear out. However, it is possible to replace the bearing blank portion 11 by grinding the worn blank 11 out of the shell 12, inserting a new hoop 13 of fabric 14, injecting the necessary elastomeric material for the matrix 22 and curing the elastomer. Nevertheless, caution should be exercised so that the heat employed to cure the elastomer does not degrade the matrix 33 of the shell 12. Should such heat be required a new bearing blank 11 could be made in the customary mold casing 21 and then cemented to the interior of the old shell 12.

INDUSTRIAL APPLICABILITY

It should thus be apparent that a bearing 10 embodying the concept of the present invention, and made pursuant to the method thereof, is fully capable of exploitation in industry and that the objects of the invention are otherwise accomplished.

I claim:

1. A method of manufacturing a non-metallic bearing having a fiber reinforced elastomeric inner bearing portion and a fiber reinforced plastic outer portion, said method comprising the steps of:

preforming a generally cylindrical fiber reinforced elastomeric bearing blank;

mounting the bearing blank on a rotatable spindle;

simultaneously rotating the spindle, wrapping a fiber fabric onto the outer circumference of the bearing blank, and impregnating the fiber fabric with a plastic resin; and curing said resin at room temperature to complete the fiber reinforced plastic shell.

2. A method, as set forth in claim 1, comprising the additional step of:

sizing the outer surface of the fiber reinforced plastic shell to the finished diameter.

3. A method, as set forth in claim 1, comprising the additional step of:

applying a selected tensile force to the fiber fabric while it is being applied to the outer surface of the bearing blank.

4. A method, as set forth in claim 1, wherein the preforming of the fiber reinforced elastomeric bearing blank comprises the additional steps of:

cutting a piece of fabric woven from reinforcing strands to a predetermined size;

placing said fabric in a mold casing;

injecting an elastomer into the fabric within said mold casing; and, curing the elastomer to complete the fiber reinforced bearing blank.

5. A method, as set forth in claim 4, wherein the preforming of the fiber reinforced bearing blank comprises the additional step of:

bending the piece of fabric into a circumferential hoop prior to inserting it into said mold casing.

6. A method, as set forth in claim 1, wherein the preforming of the fiber reinforced bearing blank comprises the additional steps of:

providing a fabric woven from fiber reinforcing cords;

applying a rubber solvent cement coating to said fabric;

drying said solvent;

curing said cement;

cutting said fabric to a predetermined size;

inserting said fabric into a mold casing;

injecting uncured elastomer into said casing and radially interiorly of said hooped fabric;

curing said elastomer to form a fiber reinforced bearing blank; and, removing said fiber reinforced bearing blank from said casing.

7. A method, as set forth in claim 6, comprising the additional step of:

bending the cut fabric into a single, circumferential hoop for insertion into the mold casing.

8. A method, as set forth in claim 7, comprising the additional step of:
selecting said mold casing such that the cured fiber reinforced bearing blank can be pressed therefrom.

9. A method, as set forth in claim 7, comprising the additional steps of:
applying a sheet of fiber reinforcing fabric to at least one side of said woven fabric that has been coated with rubber solvent cement; and,
curing said rubber cement to laminate the fabric sheets together before inserting said cut fabric into the mold casing.

* * * * *